(12) United States Patent
Marui

(10) Patent No.: US 10,144,469 B2
(45) Date of Patent: Dec. 4, 2018

(54) BICYCLE SADDLE SHAPE HOLDER APPARATUS

(71) Applicant: Shinji Marui, Kobe (JP)

(72) Inventor: Shinji Marui, Kobe (JP)

( * ) Notice: Subject to any disclaimer, the term of this patent is extended or adjusted under 35 U.S.C. 154(b) by 170 days.

(21) Appl. No.: 15/238,095

(22) Filed: Aug. 16, 2016

(65) Prior Publication Data

US 2018/0050750 A1  Feb. 22, 2018

(51) Int. Cl.
*B60N 2/38* (2006.01)
*B62J 1/08* (2006.01)

(52) U.S. Cl.
CPC ........................ *B62J 1/08* (2013.01)

(58) Field of Classification Search
CPC ...................... B62J 1/08; B62J 1/00
USPC ............... 297/195.1, 205, 215.14, 215.13
See application file for complete search history.

(56) References Cited

U.S. PATENT DOCUMENTS

| 2,167,912 | A | * | 8/1939 | Schwinn | B62J 1/06 |
| | | | | | 248/371 |
| 4,089,559 | A | * | 5/1978 | Prange | B62J 1/002 |
| | | | | | 297/201 |
| 4,141,587 | A | * | 2/1979 | Holcomb | B62J 1/08 |
| | | | | | 224/424 |
| 5,048,891 | A | * | 9/1991 | Yach | B62J 1/04 |
| | | | | | 297/215.14 |
| 5,167,435 | A | * | 12/1992 | Aldi | B62J 1/02 |
| | | | | | 297/201 |
| 5,489,139 | A | * | 2/1996 | McFarland | B62J 1/04 |
| | | | | | 248/586 |
| 5,702,093 | A | * | 12/1997 | Liao | B62J 1/04 |
| | | | | | 267/132 |
| 5,988,740 | A | * | 11/1999 | Caraballo | B62J 1/005 |
| | | | | | 297/195.1 |
| 6,089,656 | A | * | 7/2000 | Hals | B62J 1/065 |
| | | | | | 297/195.1 |
| 6,471,291 | B1 | * | 10/2002 | Dodge | B62J 1/007 |
| | | | | | 297/209 |
| 6,609,751 | B1 | * | 8/2003 | Angelo | B62J 1/005 |
| | | | | | 297/195.1 |
| 7,681,899 | B2 | * | 3/2010 | Fujiwara | B62J 1/06 |
| | | | | | 280/283 |
| 8,007,041 | B2 | * | 8/2011 | Tisue | B62J 1/08 |
| | | | | | 297/195.1 |
| 8,888,117 | B2 | * | 11/2014 | Barkley | B62J 1/02 |
| | | | | | 280/283 |
| 9,688,329 | B2 | * | 6/2017 | Pasquier | B62J 1/005 |
| 2011/0254328 | A1 | * | 10/2011 | Sloan | B62J 1/08 |
| | | | | | 297/215.14 |
| 2015/0034779 | A1 | * | 2/2015 | McAndrews | B62J 1/08 |
| | | | | | 248/125.8 |

(Continued)

*Primary Examiner* — Chi Q Nguyen
(74) *Attorney, Agent, or Firm* — Innovation Capital Law Group, LLP; Vic Lin

(57) ABSTRACT

A bicycle saddle apparatus includes a pair of saddle shape holding members that support a mid-section of a saddle base extending between the front and rear attachment sites of the rails. Each saddle shape holding member may include a rod with two opposite end portions. A first saddle-attaching portion of each rod is coupled to the saddle base. A second, opposite post-attaching portion of each rod is coupled to a top portion of a seat post or to a rail that is coupled to the seat post. The rods extend symmetrically from the seat post to left and right sides of the saddle mid-section.

19 Claims, 13 Drawing Sheets

(56) References Cited

U.S. PATENT DOCUMENTS

2015/0145293 A1\* 5/2015 Alink ................ A61H 3/04
297/201

\* cited by examiner

BICYCLE SADDLE SHAPE HOLDER APPARATUS

BACKGROUND OF THE INVENTION

1. Field of the Invention

The invention relates generally to bicycle saddles.

2. Description of Prior Art and Related Information

Conventional bicycle saddles include a cushion pad on top of a generally hard saddle base. A saddle cover may be provided for covering the saddle as a whole and placed over the top face of the cushion pad. The need to increase comfort through cushioning is caused by saddle bases made through injection molding from hard materials. Since conventional saddle bases are formed with high rigidity in order to support the load of the rider, such saddle bases lack flexibility, causing pain to the buttocks of the seated rider.

To reduce the discomfort caused by very rigid saddle bases, bicycle saddles have been formed with patterns that include several holes to enable elastic deformation in response to changes in loads. These web saddles conform the shape of the saddle seat surface to the shape of the buttocks when the rider is seated, so as to disperse pressure. While such web saddles may provide greater comfort than conventionally rigid saddles, the high number of holes make the saddle base vulnerable to elastic deformation over repeated use.

SUMMARY OF THE INVENTION

In accordance with the present invention, structures and associated methods are disclosed which address these needs and overcome the deficiencies of the prior art.

In one aspect, a bicycle saddle apparatus with a saddle shape holder is provided. The apparatus comprises a saddle having a saddle base, a seat post having a top seat post portion, and a saddle shape holder. The saddle shape holder comprises a first rod having a first saddle-attaching end portion coupled to the saddle base and a first post-attaching end portion coupled to the seat post, and a second rod having a second saddle-attaching end portion coupled to the saddle base and a second post-attaching end portion coupled to the seat post.

The first saddle-attaching portion may be coupled to a first mid-section of the saddle base so as to inhibit deformation of the first mid-section. The second saddle-attaching portion may be coupled to a second mid-section of the saddle base so as to inhibit deformation of the second mid-section.

The first saddle-attaching portion may be rotatably coupled to the saddle base. The second saddle-attaching portion may be rotatably coupled to the saddle base.

The first saddle-attaching portion and the second saddle-attaching portion may be symmetrically coupled to the saddle base.

The first post-attaching portion may be coupled to a first side surface of the seat post, and the second post-attaching portion is coupled to a second side surface of the seat post.

The saddle may be composed of a first material while the saddle shape holder may be composed of a second material more rigid than the first material.

The first saddle-attaching portion may comprise a first elongated saddle-facing hole, and the second saddle-attaching portion comprises a second elongated saddle-facing hole. The first post-attaching portion may comprise a first elongated post-facing hole, and the second saddle-attaching portion may comprise a second elongated post-facing hole.

The first post-attaching end portion may be coupled to a first rail that is coupled to the seat post, and the second post-attaching end portion may be coupled to a second rail that is coupled to the seat post.

The first rod and the second rod may be adjustable in length.

The first rod comprises a first removable reinforcing member and the second rod comprises a second removable reinforcing member.

In a further aspect, a bicycle saddle apparatus with a rail clamp is provided. The apparatus comprises a saddle comprising a saddle base and first material, a rail clamp and a saddle shape holder. The saddle shape holder comprises a second material more rigid than the first material. The saddle shape holder comprises a first rod and a second rod. The first rod has a first saddle-attaching end portion coupled to a first mid-section of the saddle base so as to inhibit deformation of the first mid-section, and a first post-attaching end portion coupled to the seat post. The second rod has a second saddle-attaching end portion coupled to a second mid-section of the saddle base and a second post-attaching end portion coupled to the seat post.

The first saddle-attaching portion and the second saddle-attaching portion may be symmetrically coupled to the saddle base.

The first saddle-attaching portion may be rotatably coupled to the saddle base. The second saddle-attaching portion may be rotatably coupled to the saddle base.

The first post-attaching portion may be positioned rearward of the first post-attaching portion. The second post-attaching portion may be positioned rearward of the second post-attaching portion.

The first post-attaching portion may be coupled to a first side surface of the seat post, and the second post-attaching portion is coupled to a second side surface of the seat post.

The first saddle-attaching portion may comprise a first elongated saddle-facing hole while the second saddle-attaching portion may comprise a second elongated saddle-facing hole. The first post-attaching portion may comprise a first elongated post-facing hole, and the second saddle-attaching portion may comprise a second elongated post-facing hole.

The first rod and the second rod may be adjustable in length.

The first rod may comprise a first removable reinforcing member. The second rod may comprise a second removable reinforcing member.

In a further aspect, a bicycle saddle apparatus comprises a saddle, a rail clamp and a saddle shape holder. The saddle comprises a saddle base and a first material. The saddle shape holder comprises a second material more rigid than the first material. The saddle shape holder further comprises a first rod and a second rod. The first rod has a first saddle-attaching end portion coupled to a first mid-section of the saddle base so as to inhibit deformation of the first mid-section, and a first post-attaching end portion coupled to the seat post. The second rod has a second saddle-attaching end portion coupled to a second mid-section of the saddle base and a second post-attaching end portion coupled to the seat post. The first saddle-attaching portion and the second saddle-attaching portion may be symmetrically coupled to the saddle base. The first saddle-attaching portion may comprise a first saddle-facing hole. The second saddle-attaching portion may comprise a second saddle-facing hole. The first post-attaching portion may comprise a first post-facing hole, and the second saddle-attaching portion may comprise a second post-facing hole.

The first rod and the second rod may be adjustable in length.

The first rod may comprise a first removable reinforcing member. The second rod may comprise a second removable reinforcing member.

In a further aspect, a bicycle saddle apparatus includes a pair of saddle shape holding members that support a mid-section of a saddle base extending between the front and rear attachment sites of the rails. Each saddle shape holding member may include a rod with two opposite end portions. A first saddle-attaching portion of each rod is coupled to the saddle base. A second, opposite post-attaching portion of each rod is coupled to a top portion of a seat post or to a rail that is coupled to the seat post. The rods extend symmetrically from the seat post to left and right sides of the saddle mid-section.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Preferred embodiments according to the present invention will be described in detail below, referencing the drawings. Note that the scope of the present invention is not limited to the embodiments or drawings set forth below, but rather may be altered and modified in many ways.

Figure 1:
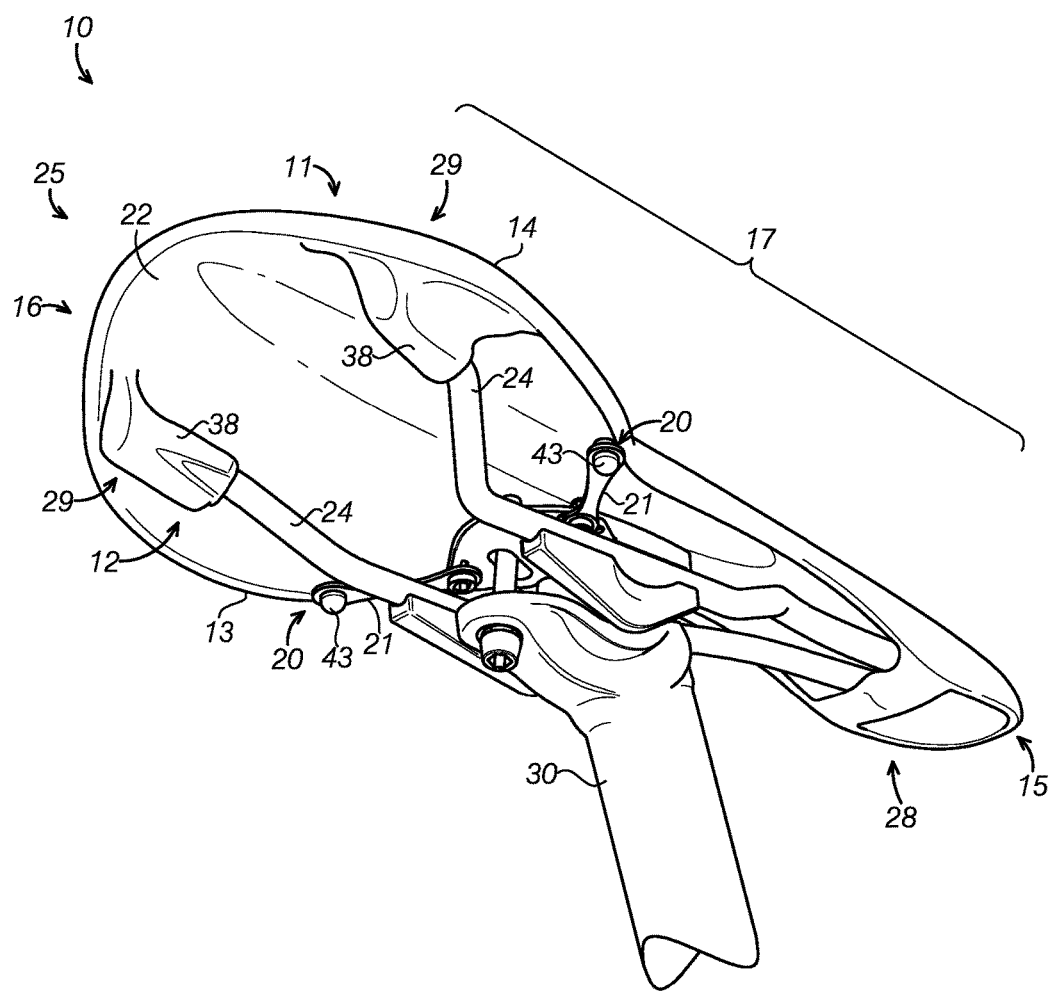
FIG. 1 is a bottom perspective view of a first preferred embodiment of a bicycle saddle apparatus.

FIG. 1 illustrates a first preferred embodiment of a bicycle saddle apparatus 10 comprising a preferred saddle shape holder 20 coupled to a saddle 25. The saddle 25 comprises a saddle base 22. The saddle base 22 comprises a top 11, bottom 12, left side 13, right side 14, front end 15, rear end 16, and a mid-section 17.

The preferred saddle apparatus 10 comprises at least one rail 24, but preferably a pair of rails 24, coupled to the bottom 12 of the saddle base 22. The rails 24 are preferably composed of rigid materials, such as metal, carbon fiber, etc. Each rail 24 is coupled to the saddle base 22 at a forward attachment site 28 and a rearward attachment site 29. In the preferred embodiment, the pair of rails 24 converge at the forward attachment site 28 of the saddle base 22 so as to be received in at least one front pocket 36. Since each rail 24 preferably diverges at the rearward attachment points 29, a pair of rear pockets 38 are provided, where each rear pocket 38 receives a rear portion of a separate corresponding rail 24.

Figure 2:
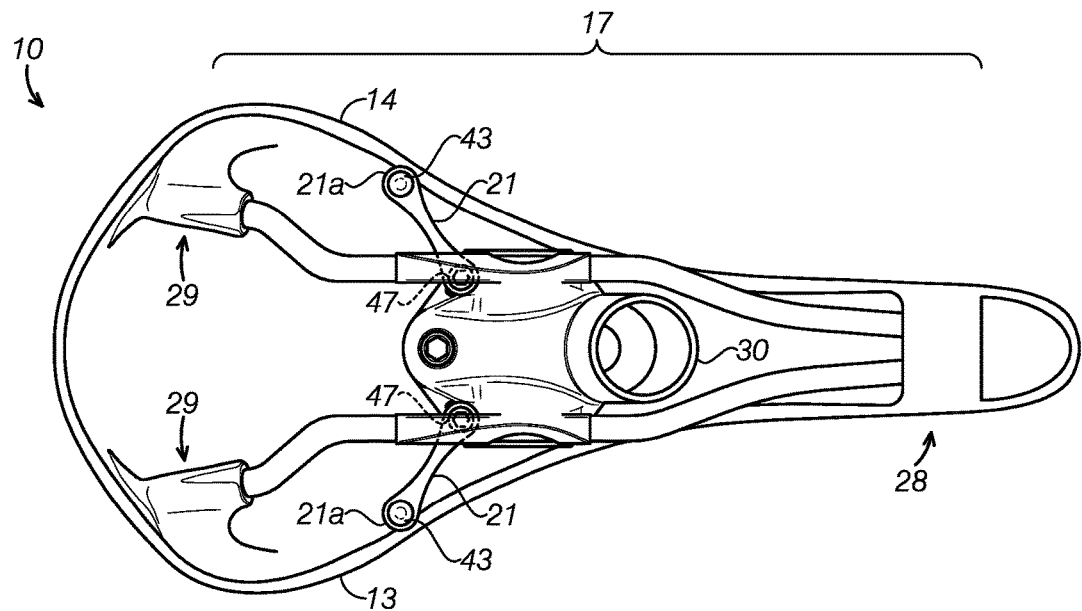
FIG. 2 is a bottom plan view of the first preferred embodiment of the bicycle saddle apparatus.

As shown in FIGS. 1 and 2, the saddle mid-section 17 generally extends between the forward rail attachment point, or points, 28 and the rear rail attachment points 29.

A preferred saddle shape holder, or saddle shape supporter, 20 supports the saddle mid-section 17 to suppress or inhibit excess deformation of the saddle portions in the saddle mid-section 17. In the preferred embodiment, the saddle shape holder 20 comprises a pair of elongate support members 21 coupled to a seat post 30 and to the saddle mid-section 17 adjacent to the left side 13 and right side 14. The elongate support members 21 are generally rigid and may have the structure of branches, legs or rods. Where the preferred embodiment shows a pair of rods 21, it is to be expressly understood that the preferred saddle shape holder 20 may comprise a single monolithic symmetrical elongate member where the pair of rods 21 are integrally formed into one structure.

Figure 3:
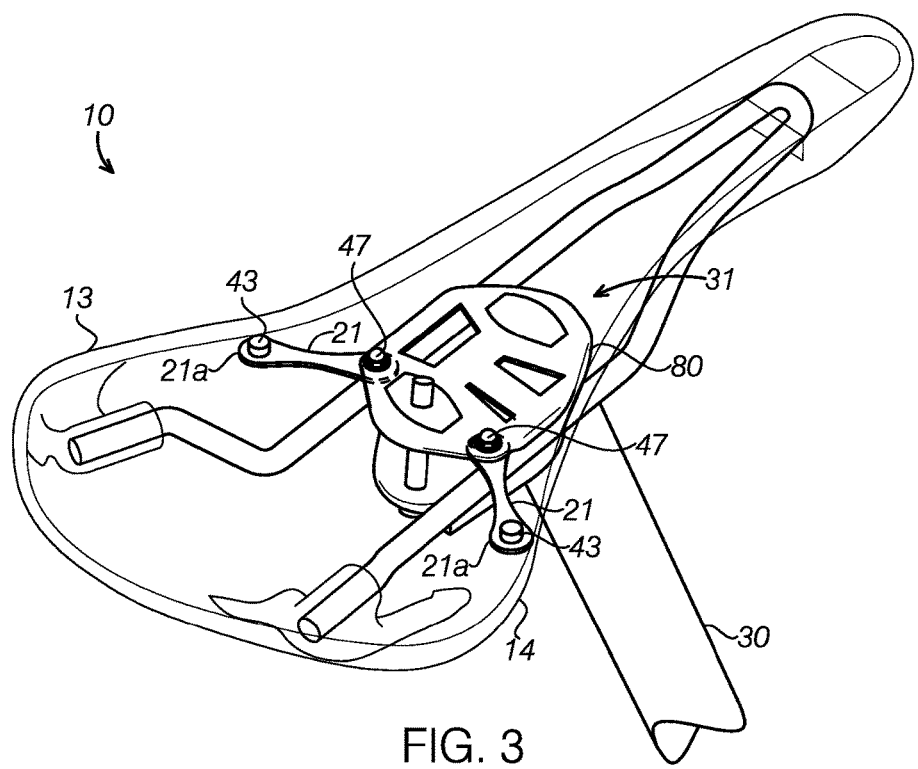
FIG. 3 is a top perspective view of the first preferred embodiment of the bicycle saddle apparatus with portions of the saddle base removed for clarity.
Figure 4:
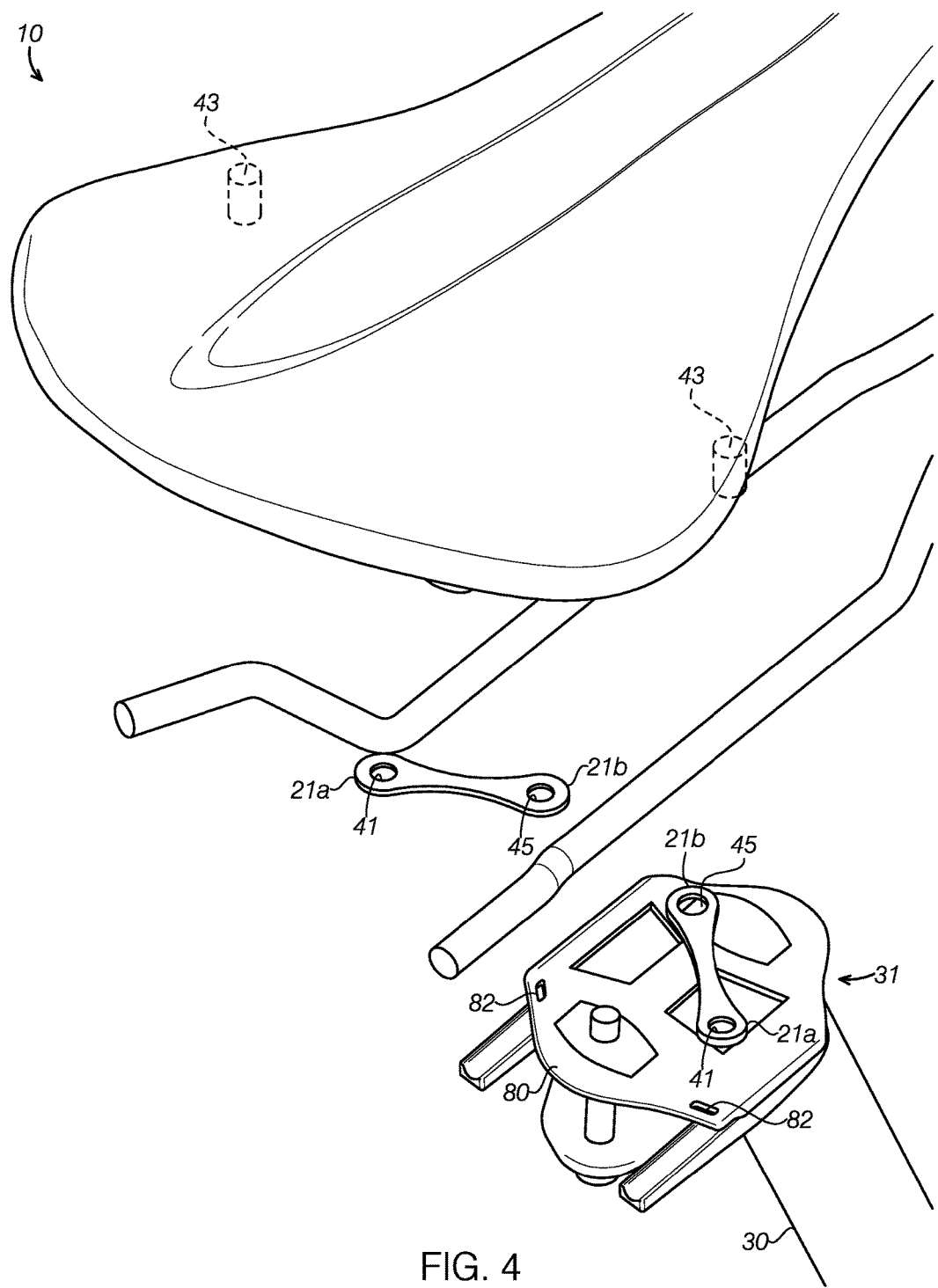
FIG. 4 is an exploded perspective view of the first preferred embodiment of the bicycle saddle apparatus.

In FIGS. 2 and 3, each rod 21 comprises a first end portion, or saddle-attaching portion, 21a configured to be coupled to the saddle mid-section 17 adjacent to the left side 13 or right side 14, and a second end portion, or post-attaching portion, 21b, configured to be coupled to a seat post 30. Each rod 21 may preferably be composed of, for example, metal, carbon fiber or synthetic polymers. The first end portion 21a preferably defines a first aperture, or saddle-adjacent opening, 41 for receiving or mating with a corresponding first connector 43 that preferably extends downward from the saddle base 22. At the opposite end of the rod 21, the second end portion 21b defines a second aperture, or post-adjacent opening, 45 for attaching to or mating with a corresponding second fastener 47. In the preferred embodiment, each rod end portion 21a, 21b preferably comprises an eyelet defining a generally circular opening. Therefore, each rod end portion 21a, 21b may be rotatably attached to the saddle base 22 and post 30, respectively.

In the preferred embodiment, the rails 24 are supported by a top portion 31 of a seat post 30, or simply top post portion 31 which may comprise a rail clamp 31. The top post portion 31 may comprise a horizontally oriented plate 80 that defines holes 82 configured to align and overlap with the second end portion 21*b* of each rod. The fastener 47 may then be inserted through both the plate hole 82 and the aligned post-adjacent opening 45 to couple to the rod 21 to the seat post 30.

Figure 5:
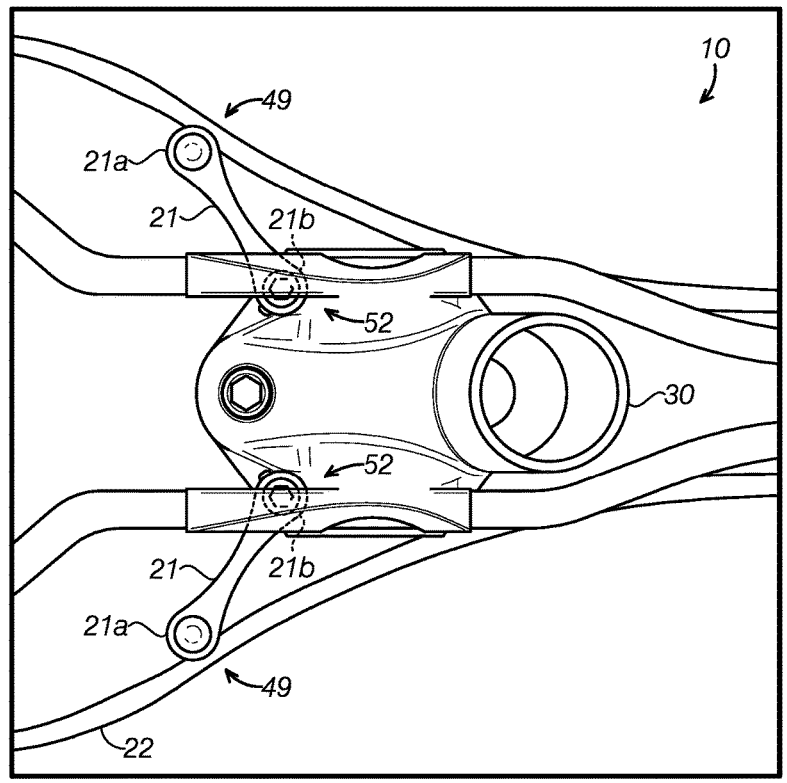
FIG. 5 is a close-up bottom plan view of the first preferred embodiment of the bicycle saddle apparatus.

In the first preferred embodiment as shown in FIG. 5, each saddle-attaching portion 21*a* is coupled to the saddle base 22 at a rearward location, or first attachment site, 49 while each post-attaching portion 21*b* is positioned at a forward location, or second attachment site, 52. In particular, each post-attaching portion 21*b* receives a post protuberance 45 extending upwardly or horizontally from the top post portion 31. Each saddle-attaching portion 21*a* may abut and support a bottom surface of the saddle base 22 at the first attachment site 49, and receive a saddle protuberance 43 that extends downwardly from the saddle base 22. It should be expressly understood that various connectors and fasteners, other than protuberances, may be used to mate with the rod end portions 21*a*, 21*b*, such as bolts and nuts, rivets, C-shaped retaining rings, E-shaped retaining rings, etc.

In the preferred embodiment, the pair of rods 21 extend symmetrically along left and right sides 13,14 of the saddle base 22. This left-right symmetry of the rods 21 results in a pair of symmetrical saddle-supporting attachment sites 49 positioned in left and right locations of the saddle midsection 17, in between the forward rail attachment point(s) 28 and the rear rail attachment points 29.

Figure 6:
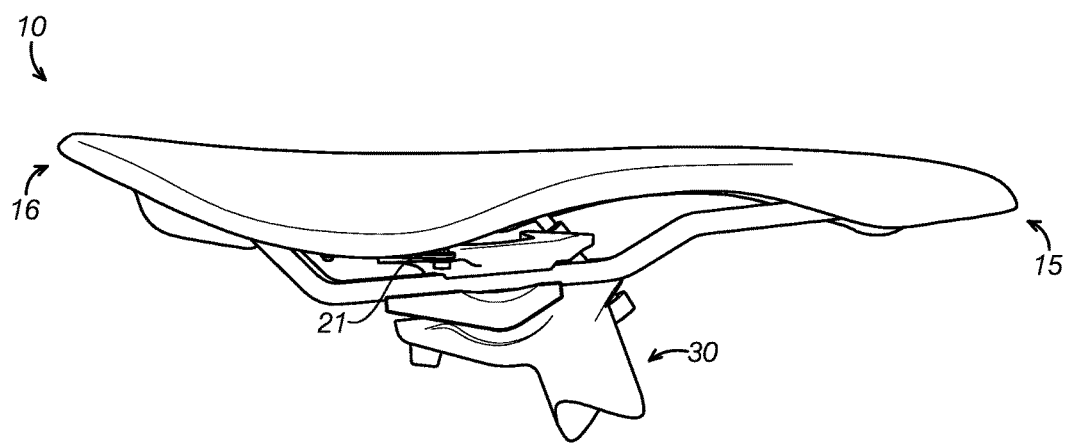
FIG. 6 is a right side elevation view of the first preferred embodiment of the bicycle saddle apparatus.
Figure 7:
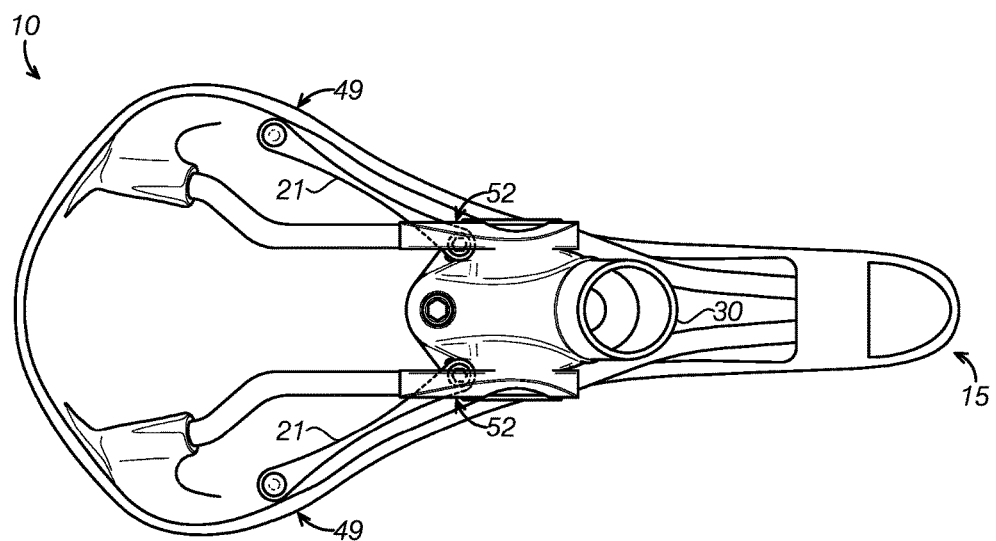
FIG. 7 is a bottom plan view of the first preferred embodiment of the bicycle saddle apparatus with a more forwardly positioned seat post.
Figure 8:
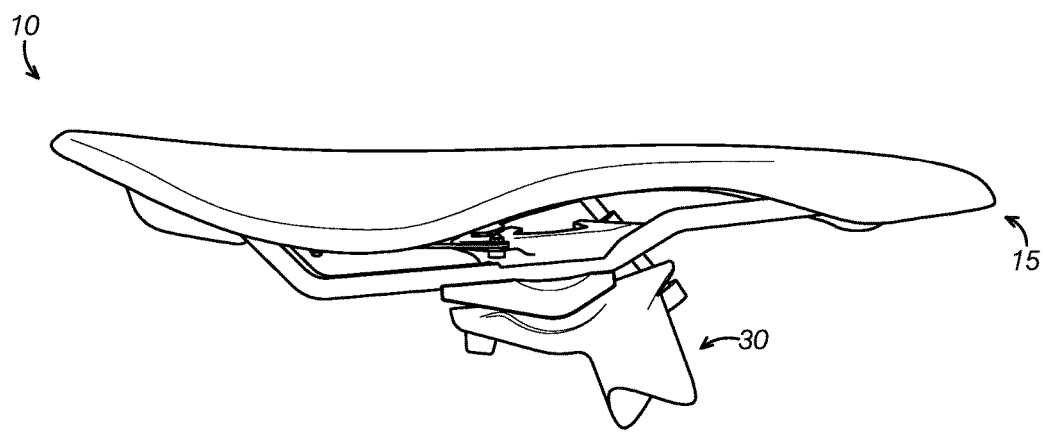
FIG. 8 is a right side elevation view of the first preferred embodiment of the bicycle saddle apparatus with the more forwardly positioned seat post shown in FIG. 7.

In the illustrated embodiment shown in FIG. 6, the seat post 30 is positioned adjacent to a center position between the front end 15 and the rear end 16. Accordingly, each rod 21 preferably has a length in the range of 30 mm to 100 mm. In certain bicycles, the seat post may be positioned closer to the front end of the saddle base. For example, in FIGS. 7 and 8, the preferred bike apparatus 10 may comprise a seat post 30 is positioned closer to the front end 15 of the saddle base 22. In this case, the rods 21 may be formed with a greater length, for example, between 0.25 to 3 inches longer, to span the distance between the saddle-attachment site 49 and the post-attachment site 52 located more forwardly than that of the preferred embodiment shown in FIGS. 1-6.

Therefore, as discussed further below with respect to FIG. 18, a kit 400 is provided according to the invention comprising multiple pairs of rods, where each pair of rods has a differing length to accommodate various positions of the seat post with respect to the saddle.

In FIGS. 9-13, a second preferred embodiment of a bicycle saddle apparatus 110 comprises a web type saddle 125 that includes a saddle mesh pad 123 coupled to a top of a web saddle base 122 defining a plurality of openings.

Figure 9:
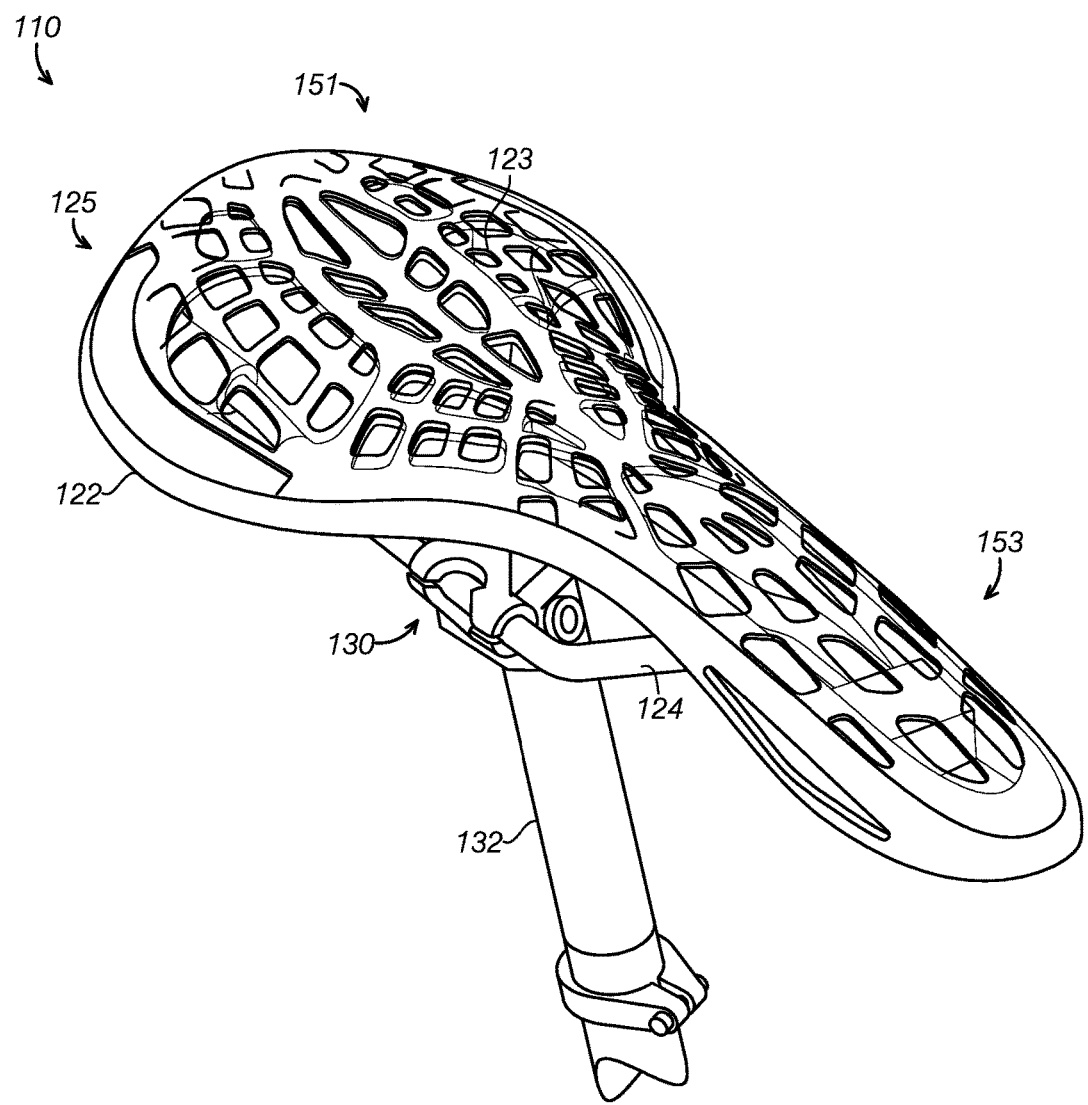
FIG. 9 is a top perspective view of a second preferred embodiment of a bicycle saddle apparatus having web saddle.

FIG. 9 shows a top perspective view of a bicycle saddle apparatus 110 according to a second preferred embodiment. The overall shape of the bicycle saddle 125 illustrated in FIG. 9 comprises a generally circular rearward seat portion 151 and an elongate thin front portion 153 that protrudes forwardly from the rearward seat portion 151. The saddle base 122 is preferably composed of a hard synthetic resin material, while the saddle mesh pad 123 is preferably composed of a synthetic resin material that is softer than the resin material of the saddle base 122. The saddle base 122 is preferably supported by a pair of rails 124 coupled to a bicycle seat post 130 that extends upwardly from a bicycle frame 132. The saddle base 122 may be preferably manufactured from fiberglass reinforced nylon, while the saddle mesh portion 123 is preferably manufactured from nylon that is not fiber reinforced.

Figure 10:
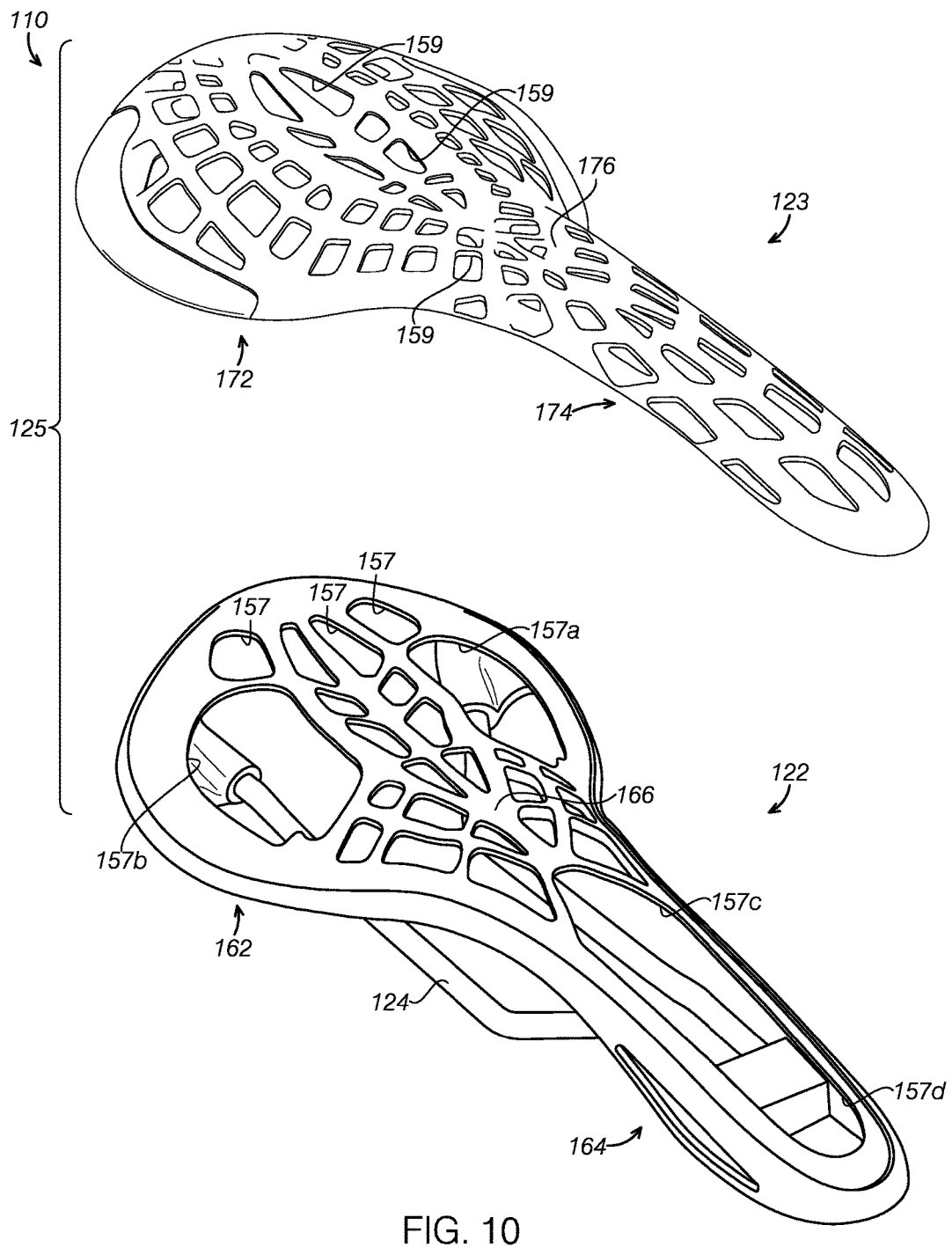
FIG. 10 is an exploded perspective view of the second preferred embodiment of a bicycle saddle apparatus.

In FIG. 10, a first plurality of through holes 157 are formed in both the saddle base 122 and a second plurality of through holes 159 are formed in the saddle mesh 123. In contrast to the mesh through holes 159 which are disposed with left-right symmetry in a mesh shape across essentially the entire region of the saddle mesh pad 123, the majority of the base through holes 157 have opening areas that are larger than the saddle mesh through holes 159 as illustrated in FIG. 10. In particular, certain base through holes 157*a*, 157*b* at the rear left and rear right, and the front through hole 157*c* have opening areas that are approximately 3 to 4 times as large as those of the mesh through holes 159. The base through holes 157, as with the mesh through holes 159, are disposed with left-right symmetry across essentially the entire region, but the forward base through holes 157*c*, 157*d* formed at the forward end portion 162 are singular holes with left-right symmetrical shapes.

As illustrated in FIG. 9, the saddle base 122 and the mesh pad 123 collectively form a rearward seat portion 162 and a long thin forward seat portion 164 that protrudes forward from the rearward seat portion 162. Additionally, the saddle base 122 has through holes 157*a*, 157*b* formed respectively in the right and left of the rearward seat portion 162, and a through hole 157*c* in the center of the forward seat portion 164. These three through holes 157*a*, 157*b*, 157*c* each have areas of opening that are between three and four times as large as those of other through holes 159 in the saddle mesh pad 123. Moreover, the saddle base through holes 157 are formed in a region of between 60% and 70% of the total area of the saddle base 122.

The mesh through holes 159 form a web type mesh structure, with generally rectangular openings of different shapes and sizes disposed radially, in a concentric pattern, from the center 176 of the rearward mesh portion 172. Moreover, elongated holes 159-*b* are linearly formed in the lengthwise direction in the forward mesh portion 174.

The positions of the two base through holes 157*a*, 157*b* on the right and left of the rearward seat portion 162 are the locations most in contact with the fleshy portion of the buttocks of the user, where the provision of the large through holes 157, 157*b* in those positions enables most of the fleshy portion of the buttocks to be supported by the highly flexible mesh pad 123. The highly flexible mesh pad 123 supports the fleshy portion of the buttocks in a hammock shape, enabling quick deformation into the shape of the buttocks, thereby further improving the flexibility and comfort by shock absorption of forces that act on the buttocks, to gently bear these forces.

Moreover, the position of the through hole 157*c* in the center 168 of the forward seat portion 164 is at a position that touches and supports the delicate body parts of the user, where the provision of a large through hole 157*c* at that forward center position 168 enables the delicate parts to be supported by only the highly flexible mesh pad 123. The mesh pad 123 with the high flexibility supports the delicate parts in the shape of a hammock, thus further improving the flexibility and comfort by absorbing and gently bearing the shock of forces that act on the delicate parts.

Figure 11:
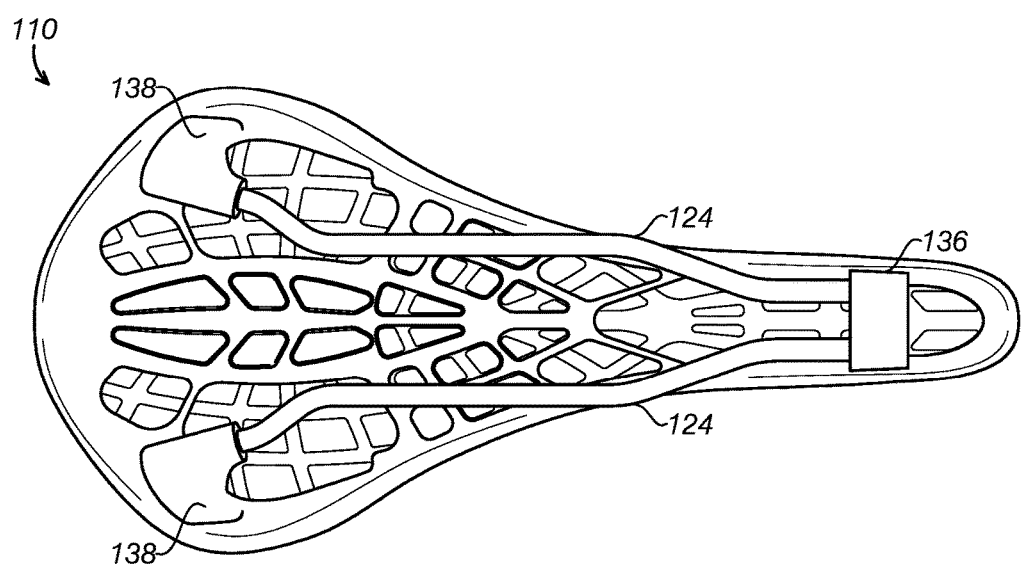
FIG. 11 is a bottom plan view of the second preferred embodiment of a bicycle saddle apparatus.

In FIG. 11, the rails 124 which preferably comprise bent metal rods are inserted in the forward pocket 136 and the rearward pockets 138. As shown in FIG. 9, the pair of rails 124 may be held and supported by the top seat post portion 130 coupled to the bicycle frame 132.

The saddle base 122 is preferably composed of a synthetic resin material with high strength and rigidity, wherein a plurality of through holes 157 are formed. The mesh pad 123 is preferably composed of a synthetic resin material that has greater flexibility than that of the saddle base 122, and is formed with the plurality of through holes 159. When the mesh pad 123 is layered on top of the saddle base 122, strength and rigidity is provided to support the load of the user on the saddle base 122 while the mesh pad 123 gently cushions the user and absorbs shocks endured while riding, thereby achieving a balanced tradeoff between flexibility and comfort, on the one hand, and strength and rigidity, on the other hand.

Moreover, the bicycle saddle 125 in the second preferred embodiment has high breathability due to the base through holes 157 and the mesh through holes 159. Proliferation of mold and germs due to inadequate ventilation are avoided. Moreover, there will be no tendency for heat to accumulate in the saddle apparatus 110. Even when stored outdoors on a sunny day, the saddle apparatus 110 will not become hot. Furthermore, since the mesh through holes 159 are formed throughout the entire region of the mesh pad 123, ventilation is provided in the gluteal region and femur that come into contact with the mesh pad 123 when riding. This reduces the likelihood of inflammation when riding in the summertime when the temperature is high or when riding over an extended period of time. The mesh pad 123 is preferably formed in the shape of a hammock, so that there is little load on the user when riding over an extended period of time, providing superior comfort.

Figure 12:
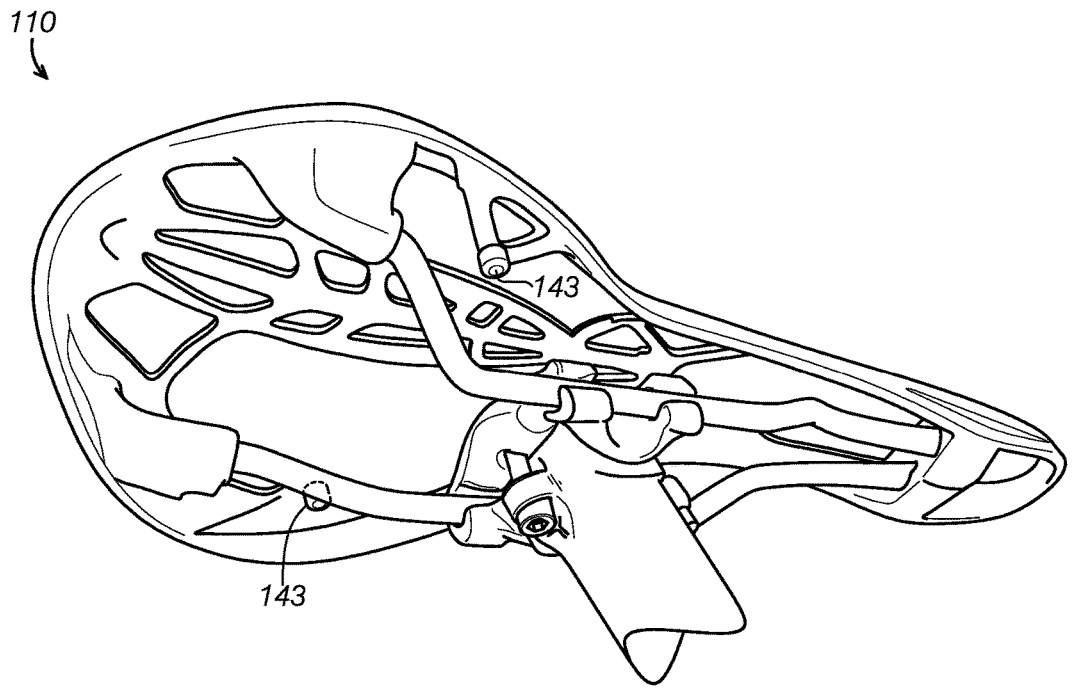
FIG. 12 is a bottom perspective view of the second preferred embodiment of a bicycle saddle apparatus with the preferred saddle shape holding members removed for clarity.

In FIG. 12, the saddle shape holder has been removed for purposes of clarity. FIG. 12 illustrates a bottom rear perspective view of the saddle 125. In the bottom perspective view of FIG. 13, the preferred saddle shape holder 120 is shown.

Figure 13:
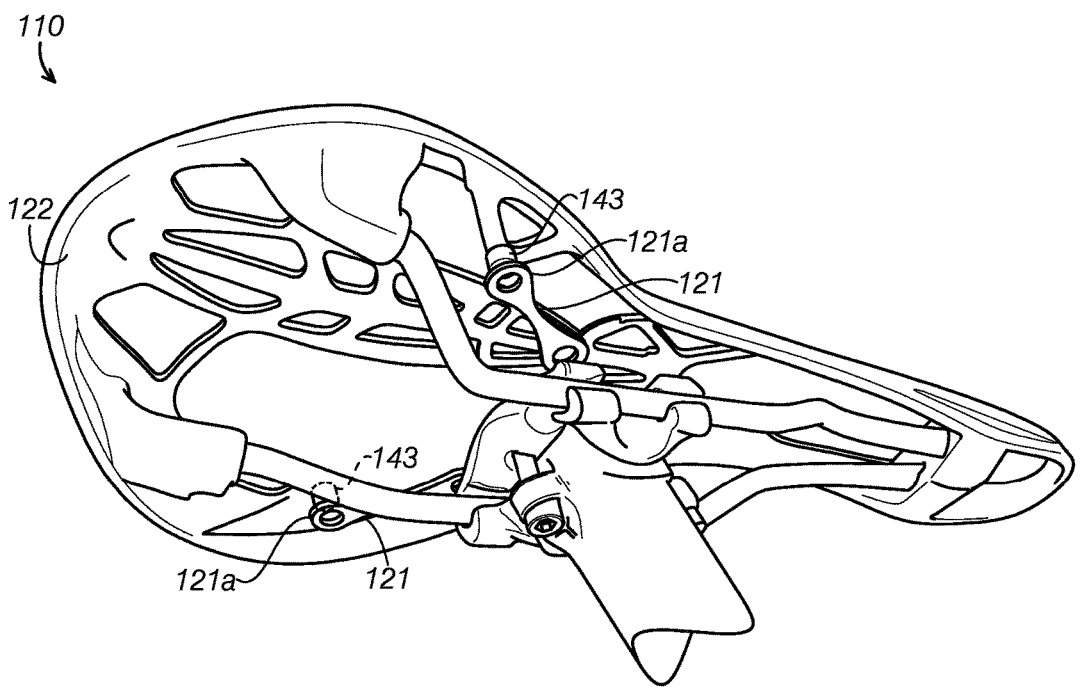
FIG. 13 is a bottom perspective view of the second preferred embodiment of a bicycle saddle apparatus.
Figure 14:
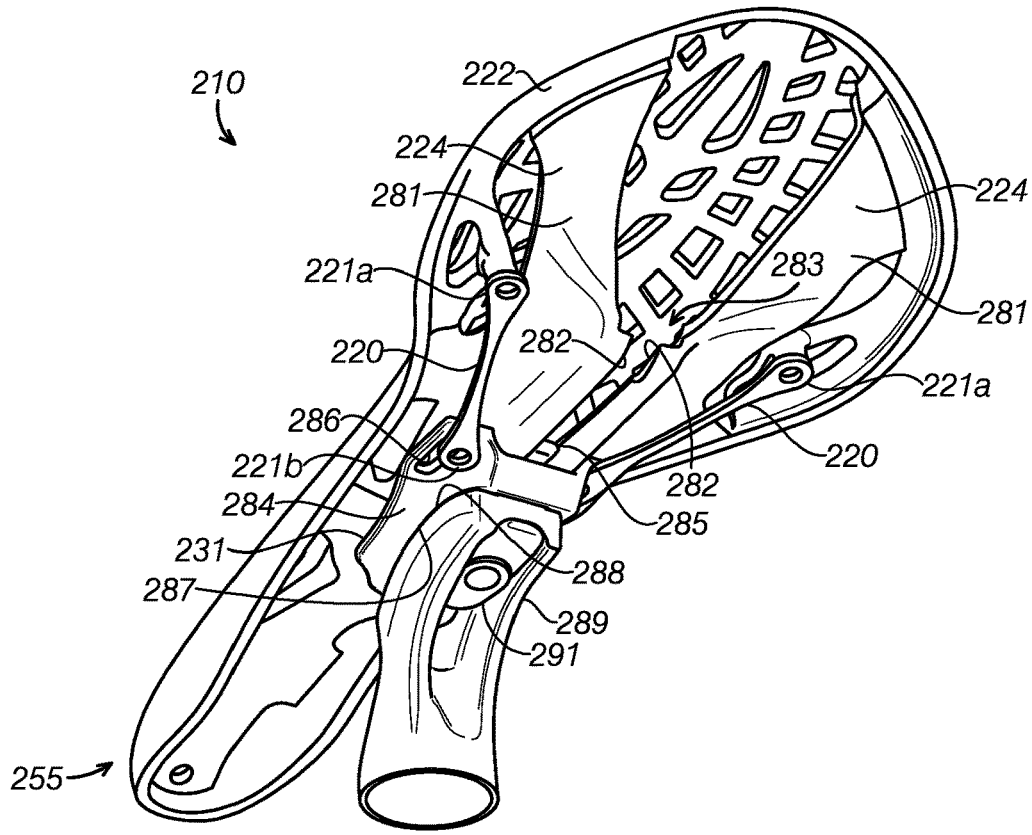
FIG. 14 is a bottom perspective view of a third preferred embodiment of a bicycle saddle apparatus.

As illustrated in FIG. 13, the saddle shape holder 120 preferably comprises a pair of saddle shape holding elongate members, or rods, 121 attached rotatably to left and right attaching sites 149 of the saddle base 122. In FIG. 14, each rod 121 comprises a first end portion 121*a* is attached to the left or right side of the saddle base 122. The rod 121 is stronger than the rigidity of the saddle base 122, and functions as a leg supporting the saddle base 122.

In FIG. 14, a third preferred embodiment of a bicycle saddle apparatus 210 comprises a saddle 225 that is movable with respect to a seat post 230. In particular, the saddle 225 is slidable in a longitudinal manner (i.e., forward and rearward) with respect to the seat post 233. The saddle 225 comprises a pair of rails 224 coupled to a bottom of a saddle base 222. Each rail 224 comprises a plate 281 that includes a medial linear edge 282. Thus, the two medial linear edges 282 collectively define a longitudinal track 283 for receiving a top seat post portion 231 coupled to the remainder of the seat post 230. In this preferred embodiment, the top seat post portion comprises a carrier 231 with side flanges 284 and a central fitting 285 that rides along the track 283. Each side flange 284 defines an elongate slot 286.

A pair of rods 220 are coupled to the saddle base 222 and the top seat post portion 231. In particular, each rod 220 comprises a saddle-attaching portion 221*a* coupled to the saddle base 222 and a post-attaching portion 221*b* coupled to the side flange 284 such that post-facing opening 245 aligns and overlaps with the elongate 286. It will be appreciated that forming the slot 286 with an elongate shape in the longitudinal direction (i.e., front to rear) provides room for the rear saddle portion 221*b* to be moved and readjusted as the saddle 225 is moved forwardly or rearwardly with respect to the seat post 230.

The carrier 231 comprises a bottom surface 287 that is longitudinally concave so as to mate with a longitudinally convex upper surface 288 of a seat post bar 289. This enables adjustment of the pitch of the saddle 225. The carrier 231 may be coupled to the seat post bar 289 with a mechanical fastener 291 or other coupling mechanism.

Figure 15:
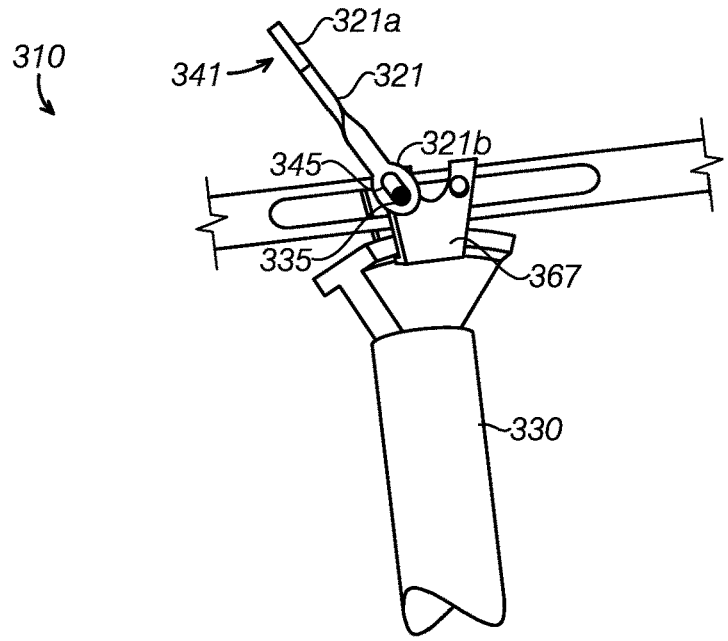
FIG. 15 is a right side perspective view of the third preferred embodiment of a bicycle saddle apparatus.

FIG. 15 illustrates a fourth preferred embodiment of a bicycle saddle apparatus 310 comprising a pair of preferred saddle shape holder 310. Each preferred saddle shape holder, or rod, 310 comprises a first elongate opening 341 defined by a saddle-attaching portion 321*a* and a second elongate opening 345 post-attaching portion 321*b*. As illustrated in FIG. 15, a saddle-facing hole 341 in the first end portion, or saddle-attaching portion, 321*a* of the saddle shape holding member 321 is axially elongated hole in the lengthwise direction so as to provide adjustability in the length of the shape holding member 321 when attaching to the saddle base 222.

Similarly, as illustrated in FIG. 15, a post-facing hole 345 in the second end portion 321*b* of the saddle shape holding member 321 is, as with the hole in the first end portion 1*a*, axially elongated in the lengthwise direction so as to provide adjustability in the length of the shape holding member 321 when attaching to the seat post 230.

Because the positions of the attaching screws 335 can be adjusted through these elongated holes, the positions for attaching to the saddle base can be fine-adjusted in the front/rear direction of the seat post.

While the illustrated embodiment of the saddle shape holder 321 shows two elongate holes 341, 345 at opposite ends, it should be expressly understood that the shape holder may simply comprise a single elongate hole at only end to accomplish the same purpose of lengthwise adjustability.

In FIG. 15, the illustrated bicycle saddle apparatus 310 comprises a dedicated seat post that may not provide adequate space for attaching the second end portion 321*b* of the saddle shape holding member 321 above the seat post 330. Therefore, the space at the side face 367 of the seat post 330 is used, as illustrated in FIG. 15. The saddle shape holding member 321 may be formed with a twist 370 such that the saddle-attaching portion 321*b* faces a vertical side face, or sidewall, 367 of the seat post 330. A laterally extending attachment screw 265 may be inserted through the saddle-attaching portion 321*b* and coupled to the vertical sidewall 367.

Although the second preferred embodiment bicycle saddle described above comprises mesh through holes in the rearward seat portion of the mesh pad that are arranged so as to form a web-type mesh structure, it is to be expressly understood that the mesh through holes may be formed irregularly. Moreover, the through holes may be concentrated in regions wherein greater cushioning and elastic deformation are required, and formed sparsely in other parts.

In the third preferred embodiment of bicycle saddle described above, the elongated holes of the saddle shape holders may be formed in the center position of the rods instead of the ends, thereby enabling the center position to be rotated and adjusted.

In the bicycle saddle according to the third embodiment described above, saddle shape holding members having different lengths are substituted in order to adjust the lengths of the saddle shape holding members. It is to be expressly understood, however, that the saddle shape holding members themselves may be adjustable-length poles structured from a plurality of nested telescoping tubes. Alternatively, the saddle shape holding members may have a layered structure of sliding plates capable of sliding in the lengthwise direction or of being adjustable lengthwise.

As an alternative to the bicycle saddles in the second embodiment and third embodiment, described above, the saddle apparatus may comprise a saddle base composed of a synthetic resin that is formed with a large number of through holes to enable elastic deformation depending on a change in load.

In the first embodiment through the third embodiment discussed above, the saddle shape holding members are attached to a top face or flange of the seat post. For a bicycle with a saddle support column or post that is rigidly attached and a vertical pipe in the bicycle frame into which the saddle support column can be inserted, the saddle shape holders may be attached to the side peripheral surface of the vertical pipe of the seat post. When attaching with a single location, the attachment is to the peripheral face surface on the forward side or rearward side of the vertical pipe. When attaching at two locations, the attachment is to the peripheral side face on the left and the right of the vertical pipe.

Figure 16:
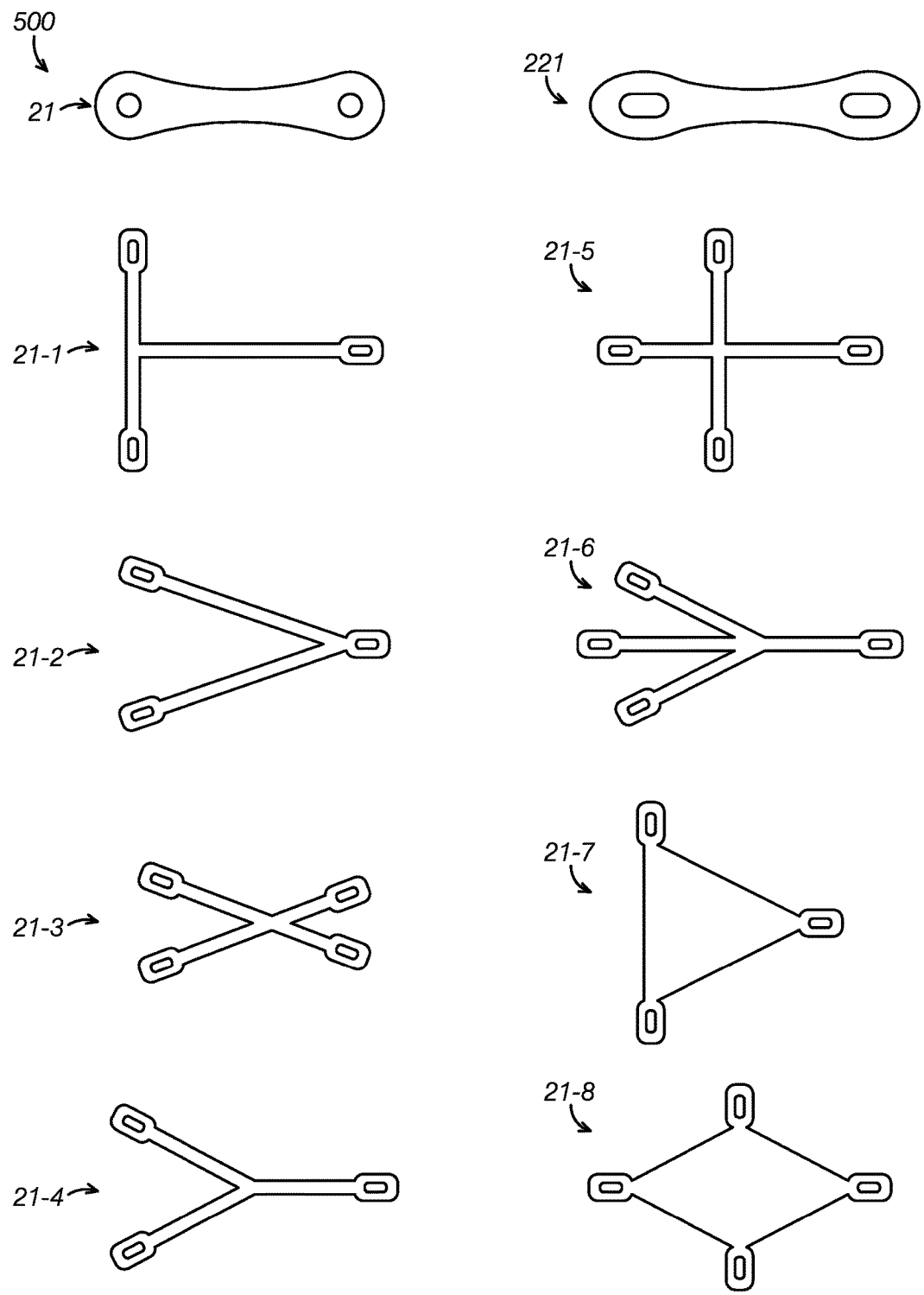
FIG. 16 is a diagram of a kit of preferred saddle shape holding members.
Figure 17:
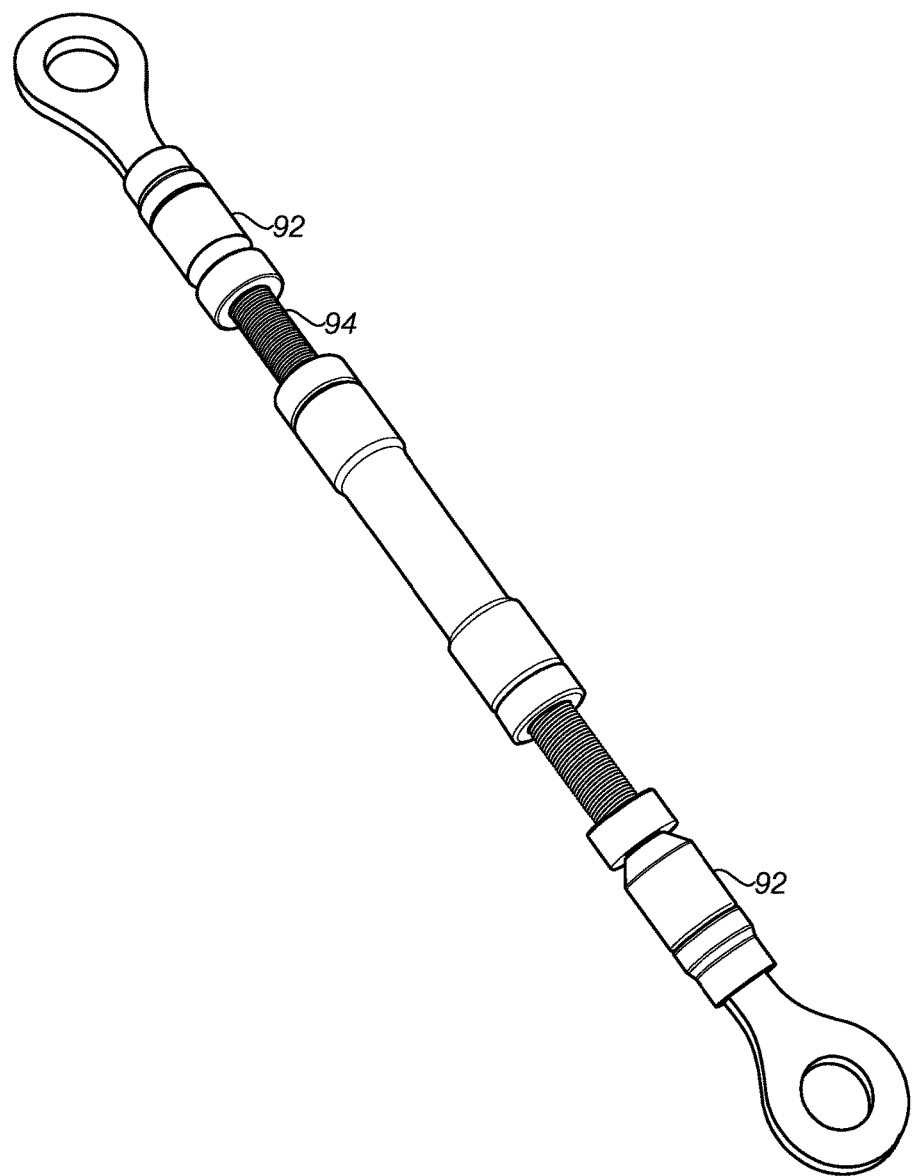
FIG. 17 is a perspective view of an adjustable rod.

In FIG. 16, a preferred kit 500 of varying saddle shape holders is provided according to the invention. As shown in FIG. 17, the saddle shape holders may comprise a variety of differently shaped structures with different lengths and various shapes of openings. While in the first embodiment through the third embodiment set forth above, a rod-shaped saddle shape holding material (a saddle shape holding member) was used, the saddle shape holding member instead, as illustrated in FIG. 12, may be given various variations in shape such as a T shape 21-1, a V shape 21-2, an X shape 21-3, a Y shape 21-4, a cross shape 21-5, a rod shape provided with branches to the left and to the right 21-6, an isosceles triangle 21-7, or a quadrilateral wherein the diagonal lines are perpendicular, such as a diamond shape 21-8. Moreover, in the various shapes illustrated in FIG. 17, first end portions 1a that attach to the saddle base and second end portions 1b that attach to the saddle attaching body or the vertical pipe are illustrated.

FIG. 17 is a perspective view of an adjustable rod 21-9 which may comprise a turnbuckle rod. The adjustable rod 21-9 may comprise a pair of outer eyelets, each attached to female coupling 92 with internally threaded portions that mate with an externally threaded shaft 94 to enable the overall length of the rod 21-9 to be adjusted.

Figure 18:
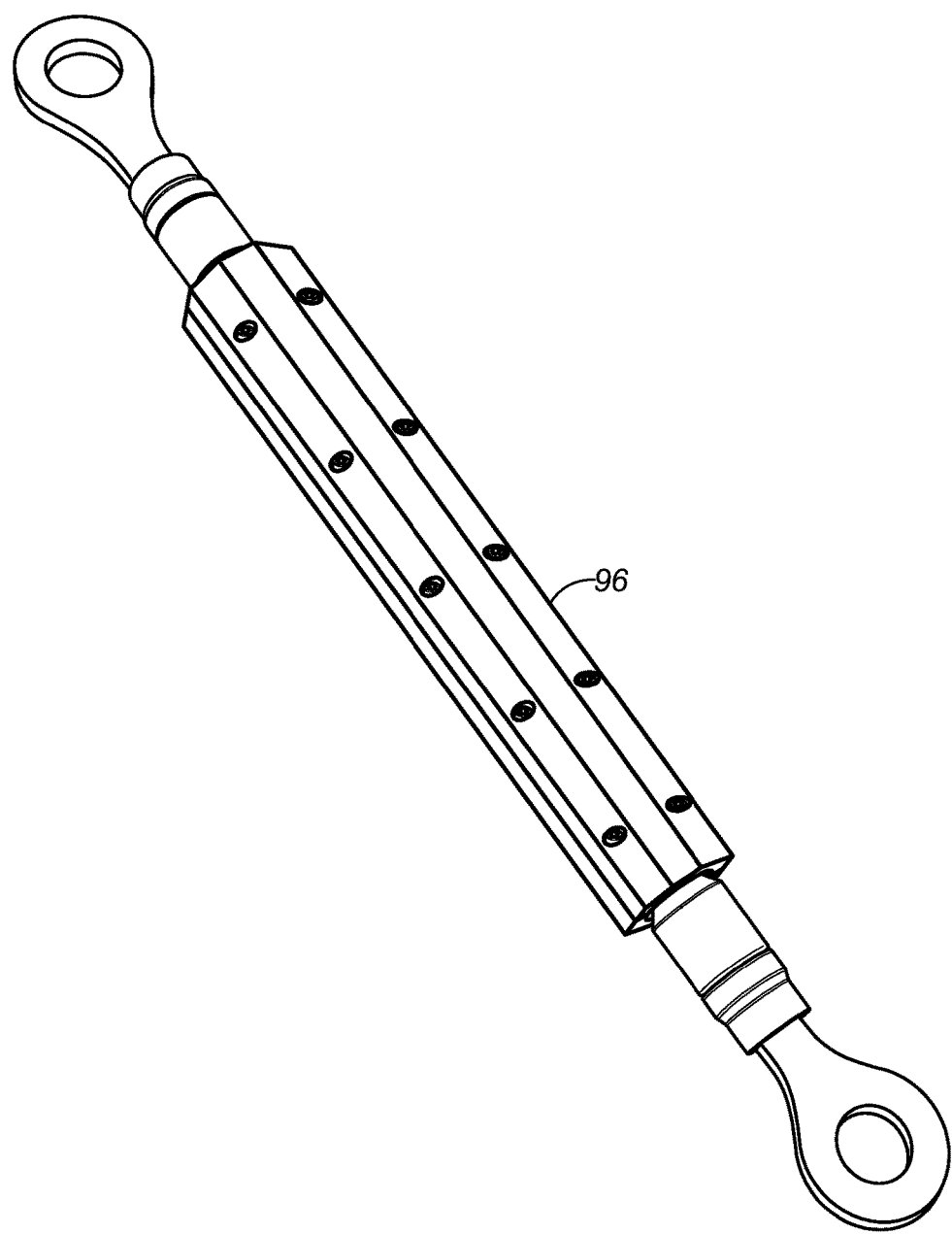
FIG. 18 is a perspective view of a reinforced rod.

FIG. 18 is a perspective view of a reinforced rod 21-10 comprising a removable outer sleeve 96 so as to provide reinforcement.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A bicycle saddle apparatus, comprising;
   a saddle having a saddle base;
   a seat post having a top seat post portion;
   a saddle shape holder comprising:
      a first rod having a first saddle-attaching end portion coupled to a first side of a mid-section of the saddle base and a first post-attaching end portion coupled to the seat post, and
      a second rod having a second saddle-attaching end portion coupled to a second side, opposite the first side, of the mid-section of the saddle base and a second post-attaching end portion coupled to the seat post, wherein
   the first saddle-attaching portion comprises a first elongated saddle-facing hole;
   the second saddle-attaching portion comprises a second elongated saddle-facing hole;
   the first post-attaching portion comprises a first elongated post-facing hole; and
   the second saddle-attaching portion comprises a second elongated post-facing hole.

2. The bicycle saddle apparatus of claim 1, wherein:
   the first saddle-attaching portion is coupled to a first mid-section of the saddle base so as to inhibit deformation of the first mid-section; and
   the second saddle-attaching portion is coupled to a second mid-section of the saddle base so as to inhibit deformation of the second mid-section.

3. The bicycle saddle apparatus of claim 1, wherein:
   the first saddle-attaching portion is rotatably coupled to the saddle base; and
   the second saddle-attaching portion is rotatably coupled to the saddle base.

4. The bicycle saddle apparatus of claim 1, wherein:
   the first saddle-attaching portion and the second saddle-attaching portion are symmetrically coupled to the saddle base.

5. The bicycle saddle apparatus of claim 1, wherein:
   the first post-attaching portion is coupled to a first side surface of the seat post; and
   the second post-attaching portion is coupled to a second side surface of the seat post.

6. The bicycle saddle apparatus of claim 1, wherein:
   the saddle is composed of a first material; and
   the saddle shape holder is composed of a second material more rigid than the first material.

7. The bicycle saddle apparatus of claim 1, wherein:
the first post-attaching end portion is coupled to a first rail that is coupled to the seat post, and
the second post-attaching end portion coupled to a second rail that is coupled to the seat post.

8. The bicycle saddle apparatus of claim 1, wherein:
the first rod is adjustable in length; and
the second rod is adjustable in length.

9. The bicycle saddle apparatus of claim 1, wherein:
the first rod comprises a first removable reinforcing member; and
the second rod comprises a second removable reinforcing member.

10. The bicycle saddle apparatus of claim 1, wherein:
the first post-attaching end portion is coupled to a first rail that is coupled to the seat post, and
the second post-attaching end portion coupled to a second rail that is coupled to the seat post.

11. A bicycle saddle apparatus, comprising;
a saddle having a saddle base;
a seat post having a top seat post portion;
a saddle shape holder comprising:
    a first rod having a first saddle-attaching end portion coupled to a first side of a mid-section of the saddle base and a first post-attaching end portion coupled to the seat post, and
    a second rod having a second saddle-attaching end portion coupled to a second side, opposite the first side, of the mid-section of the saddle base and a second post-attaching end portion coupled to the seat post, wherein
the first post-attaching end portion is coupled to a first rail that is coupled to the seat post, and
the second post-attaching end portion coupled to a second rail that is coupled to the seat post.

12. The bicycle saddle apparatus of claim 11, wherein:
the saddle is composed of a first material; and
the saddle shape holder is composed of a second material more rigid than the first material.

13. The bicycle saddle apparatus of claim 11, wherein:
the first saddle-attaching portion is rotatably coupled to the saddle base; and
the second saddle-attaching portion is rotatably coupled to the saddle base.

14. The bicycle saddle apparatus of claim 11, wherein:
the first post-attaching portion is positioned rearward of the first post-attaching portion; and
the second post-attaching portion is positioned rearward of the second post-attaching portion.

15. The bicycle saddle apparatus of claim 11, wherein:
the first rod is adjustable in length; and
the second rod is adjustable in length.

16. A bicycle saddle apparatus, comprising;
a saddle having a saddle base;
a seat post having a top seat post portion;
a saddle shape holder comprising:
    a first rod having a first saddle-attaching end portion coupled to a first side of a mid-section of the saddle base and a first post-attaching end portion coupled to the seat post, and
    a second rod having a second saddle-attaching end portion coupled to a second side, opposite the first side, of the mid-section of the saddle base and a second post-attaching end portion coupled to the seat post, wherein
the first rod is adjustable in length; and
the second rod is adjustable in length.

17. The bicycle saddle apparatus of claim 16, wherein:
the saddle is composed of a first material; and
the saddle shape holder is composed of a second material more rigid than the first material.

18. The bicycle saddle apparatus of claim 16, wherein:
the first post-attaching end portion is coupled to a first rail that is coupled to the seat post, and
the second post-attaching end portion coupled to a second rail that is coupled to the seat post.

19. The bicycle saddle apparatus of claim 16, wherein the first saddle-attaching portion and the second saddle-attaching portion are symmetrically coupled to the saddle base.

* * * * *